(12) United States Patent
Uht et al.

(10) Patent No.: US 7,380,108 B1
(45) Date of Patent: *May 27, 2008

(54) AUTOMATIC AND TRANSPARENT HARDWARE CONVERSION OF TRADITIONAL CONTROL FLOW TO PREDICATES

(75) Inventors: Augustus K. Uht, Cumberland, RI (US); David Morano, Malden, MA (US); David Kaeli, Medway, MA (US)

(73) Assignee: Board of Govenors for Higher Education, State of Rhode Island and Providence Plantations, Providence, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/515,220

(22) Filed: Aug. 31, 2006

Related U.S. Application Data

(63) Continuation of application No. 09/838,678, filed on Apr. 19, 2001, now Pat. No. 7,210,025.

(60) Provisional application No. 60/198,300, filed on Apr. 19, 2000.

(51) Int. Cl.
*G06F 15/00* (2006.01)
(52) U.S. Cl. .................................... 712/226
(58) Field of Classification Search ................ 712/226
See application file for complete search history.

(56) References Cited

U.S. PATENT DOCUMENTS 6,041,399 A * 3/2000 Terada et al. ................ 712/24

6,662,294 B1 * 12/2003 Kahle et al. ................ 712/226

OTHER PUBLICATIONS

Klauser et al., Dynamic Hammock Predication for Non-Predicated Instruction Set Architectures, Proceedings of the 1998 International Conference on Parallel Architectures and Compilation Techniques, Oct. 1998.*
http://www.websters-online-dictionary.org/ search term: backward compatible. cited by examiners.
http://www.webopedia.com/ search term: backward compatible. cited by examiner.
http://foldoc.org/ search term: backward compatible. cited by examiner.
Microsoft Press.RTM.. "Computer Dictionary: The Comprehensive Standard for Business, School, Library, and Home". Second Edition. Redmond, Washington: Microsoft Press, .COPYRGT. 1994. p. 133. cited by examiner.
Agerwala et al., "Data Flow Systems—Special Issue," IEEE Computer, vol. 15, No. 2, pp. 10-13, 1982. cited by other.
Aiken et al., "Perfect Pipelining: A New Loop Parallelization Technique," in Proceedings of the 1988 European Symposium on Programming, 1988, 15 pages total. cited by other.

(Continued)

*Primary Examiner*—Aimee J Li
(74) *Attorney, Agent, or Firm*—Connolly Bove Lodge & Hutz LLP

(57) ABSTRACT

A computing device that provides hardware conversion of flow control predicates associated with program instructions executable within the computing device, detects the beginning and the end of a branch domain of the program instructions, and realizes the beginning and the end of the branch domain at execution time, for selectively enabling and disabling instructions within said branch domain.

8 Claims, 5 Drawing Sheets

OTHER PUBLICATIONS

Austin et al., "Dynamic Dependency Analysis of Ordinary Programs," in Proceedings of the 19th Annual International Symposium on Computer Architecture, Gold Coast, Australia, pp. 342-351, IEEE and ACM, May 1992. cited by other.

Banerjee et al., "Fast Execution of Loops With IF Statements," IEEE Transactions on Computers, vol. C-33, pp. 1030-1033, Nov. 1984. cited by other.

Beck et al., "The cydra 5 minisupercomputer: Architecture and implementation," Journal of Supercomputing, vol. 7, pp. 143-180, 1993. cited by other.

Breckelbaum et al., "Hierarchical Scheduling Windows," in Proceedings of the 35th Annual International Symposium on Microarchitecture. Istanbul, Turkey: IEEE, ACM, Nov. 2002. cited by other.

Burger et al., "Billion-Transistor Architectures," IEEE Computer, vol. 30, No. 9, Sep. 1997. cited by other.

Burger et al., "The SimpleScalar Tool Set, Version 2," URL: http://www.simplescalar.com/docs/usersguide.sub.—v2.pdf, created 1997, accessed: Jun. 14, 2002. cited by other.

Calder et al., "Value profiling," in Proceedings of the 30th IEEE Symposium on Microarchitecture, Dec. 1997. cited by other.

Chen, "Supporting Highly Speculative Execution via Adaptive Branch Trees," in Proceedings of the 4th Annual International Symposium on High Peiformance Computer Architecture: IEEE, Jan. 1998, pp. 185-194. cited by other.

Cleary et al., "Scaling the reorder buffer to 10,000 instructions," in IEEE TCCA News, pp. 16-20, Jun. 2000. cited by other.

Cleary et al., "The Architecture or an Optimistic CPU: The Warp Engine," in Proceedings of the HICSS'95, pp. 163-172, University of Hawaii, Jan. 1995. cited by other.

Colwell et al., "A VLIW Architecture For A Trace Scheduling Compiler," IEEE Transaction on Computers, vol. C-37, pp. 967-979, Aug. 1988. cited by other.

Colwell et al., "A VLIW Architecture for a Trace Scheduling Compiler," in Proceedings of the Second International Conference Architectural Support for Programming Languages and Operating Systems (ASP LOS II): ACM and IEEE. Sep. 1987, pp. 180-192. cited by other.

Cragon, Branch Strategy Taxonomy and Performance Models, Los Alamitos, California: IEEE Computer Society Press, 1992, 9 pages total. cited by other.

Cytron, "Doacross: Beyond Vectorization for Multiprocessors (Extended Abstract)," in Proceedings of the 1986 International Conference on Parallel Processing, pp. 836-844, Pennsylvania State University and the IEEE Computer Society, Aug. 1986. citedby other.

Dutta et al., "Control Flow Prediction with Tree-Like Subgraphs for Superscalar Processors," in Proceedings of the 28th International Symposium Micmarchitecture (MICRO-28), pp. 258-263, IEEE and ACM, Nov./Dec. 1995. cited by other.

Ebcioglu et al., "DAISY: Dynamic Compilation for 100% Architectural Compatibility," IBM Research Report RC 20538, IBM Research Division, Aug. 5, 1996, 82 pages total. cited by other.

Ebcioglu, "A Compilation Technique for Software Pipelining of Loops with Conditional Jumps," in Proceedings of the Twentieth Annual Workshop on Microprogramming (MICRO20), pp. 69-79, Association of Computing Machinery, Dec. 1987. cited by other.

Ellis, Bulldog: A Compliler for VLIW Architectures. PhD thesis, Yale University, New Haven, CT, 292 total pages, 1985. cited by other.

Foster et al., "Percolation of Code to Enhance Parallel Dispatching and Execution," IEEE Transactions on Computers, vol. C-21, pp. 1411-1415, Dec. 1972. cited by other.

Franklin et al., "Register Traffic Analysis for Streamlining Inter-Operation Communication in Fine-Grain Parallel Processors," in Proceedings of the Twenty-Fifth international Symposium on Microarchitecture (MICRO-25): IEEE and ACM, Dec. 1992, pp. 236-245. cited by other.

Franklin et al., "The Expandable Split Window Paradigm for Exploring Fine-Grain Parallelism," in Proceedings of the 19th International Syposium on Computer Architecture, pp. 58-67, ACM, May 1992. cited by other.

Ginosar et al., "Adaptive Synchronization," in Proceedings of the 1998 International Conference on Computer Design, 2 pages total, 1998. cited by other.

Glass, "Crusoe: Transmeta comes out of the closet," in http://www.linuxplanet.com/linuxplanet/reports/1441/1/, 6 pages total, 2000. cited by other.

Gonzalez et al., "Limits on Instruction-Level Parallelism with Data Speculation," Department Architecture de Computadores, Universitat Polytechnica Catalan, Barcelona, Spain, Technical Report UPC-DAC-1997-34, 14 pages total, 1997. cited by other.

Gopal et al., "Speculative Versioning Cache," University of Wisconsin, Madison, Technical Report TR-1334, 11 pages total, Jul. 1997. cited by other.

Gostelow, "The u-interpreter," IEEE Computer, vol. 15, pp. 42-49, Feb. 1982. cited by other.

Gurd et al., "The manchester prototype dataflow computer," Communications of the ACM, vol. 28, pp. 34-52, Jan. 1985. cited by other.

Henning, "SPEC CPU2000: Measuring CPU Performance in the New Millenium," IEEE Computer, vol. 33, No. 7, pp. 28-35, Jul. 2000. cited by other.

Henry et al., "Circuits for Wide-Window Superscalar Processors," in Proceedings of the 27th Annual International Symposium on Computer Architecture. Vancouver, BC, Canada: IEEE and ACM, Jun. 10-14, 2000, pp. 236-247. cited by other.

Henry et al., "The Ultrascalar Processor: An Asymptotically Scalable Superscalar Microarchitecture," in HIPC '98, Dec. 1998, URL: http://ee.yale.edu/papersIHIPC98-abstract.ps.gz, 18 pages total. cited by other.

Huck et al., "Introducing the ia-64 architecture," in IEEE Micro, pp. 12-23, Sep. 2000. cited by other.

Jefferson, "Virtual time," Transactions on Programming Languages and Systems, vol. 7, No. 3, pp. 404-425, Jul. 1985. cited by other.

Jouppi et al., "Available instruction-level parallelism for superscalar and superpipelined machines," in Proceedings of the International Conference on Architectural Support for Programming Languages and Operating Systems, pp. 272-282, Apr. 1989.cited by other.

Karkhanis et al., "A Day in the Life of a Data Cache Miss," in Proceedings of the 2nd Annual Workshop on Memory Peiformance Issues (WMPI), at the 29th International Symposium on Computer Arhcitecture (ISCA 2002). Anchorage, Alaska, May 2002. citedby other.

Khalafi et al., "Realizing High IPC Through a Scalable Memory-Latency Tolerant Multipath Microarchitecture," Department of Electrical and Computer Engineering, University of Rhode Island, Kingston, RI 02881-0805, Technical Report 032002-0101, Apr. 2, 2002, URL: http://www.ele.uri.edu/.about.uht/papers/Levo4TR032002-01-uht.sub.—Ol.l)- df., 11 pages total. cited by other.

Kim et al., "An Instruction Set Architecture and Microarchitecture for Instruction Level Distributed Processing," in Proceedings of the 29th Annual International Symposium on Computer Architecture. Anchorage, Alaska, USA: ACM, May 25-29, 2002. citedby other.

Krewell, "Intel's McKinley Comes Into View," Cahners Microprocessor, vol. 15, No. 10, pp. 1, Oct. 5, 2001. cited by other.

Kumar, "Measuring Parallelism in Computation-Intensive Scientific Engineering Applications." IEEE Transactions on Computers, vol. 37, No. 9, pp. 1088-1098, Sep. 1988. cited by other.

Lam et al., "Limits of Control Flow on Parallelism," in Proceedings of the 19th Annual International Symposium on Computer Architecture. Gold Coast, Australia: IEEE and ACM, May 1992, pp. 46-57. cited by other.

Lebeck et al., "A Large, Fast Instruction Window for Tolerating Cache Misses," in Proceedings of the 29th Annual International Symposium on Computer Architecture. Anchorage, Alaska, USA: ACM, May 25-29, 2002, 12 pages total. cited by other.

Lee et al., "Branch Prediction Strategies and Branch Target Buffer Design," COMPUTER, vol. 17, pp. 6-22, Jan. 1984. cited by other.

Lepak et al., "On the value locality of store instructions," in Proceedings of the International Symposium on Computer Architecture, pp. 182-191, Jun. 2000. cited by other.

Lilja, "Reducing the Branch Penalty in Pipelined Processors," Computer, vol. 21, pp. 47-55, Jul. 1988. cited by other.

Lipasti et al., "Superspeculative Microarchitecture for Beyond AD 2000," IEEE Computer, vol. 30, No. 9, pp. 59-66, Sep. 1997.

Lipasti et al., "Value Locality and Load Value Prediction," in Proceedings of the Seventh Annual International Conference on Architectural Support for Programming Languages and Operating Systems (ASPLOS-VII). Boston, MA: IEEE and ACM, Oct. 1996, pp. 138-147.

Mahlke et al., "A Comparison of Full and Partial Predicated, Execution Support for ILP Processors," in Proceedings of the 22$^{nd}$ Annual International Symposium on Computer Architecture, pp. 138-149, IEEE and ACM, May 1995.

Morano et al., "Implications of Register and Memory Temporal Locality for Distributed Microarchitectures," Dept. of Electrical and Computer Engineering, Northeastern University, Boston, MA, USA, Technical Report, Oct. 2002, pp. 120, URL: http://www.ece.neu.edu/groups/nucar/publications/intervals.pdf.

Morano et al., "Realizing High IPC Through a Scalable Memory-Latency Tolerant Multipath Microarchitecture," in Proceedings of the Workshop on Chip Multiprocessors: Processor Architecture and Memory Hierarchy Related Issues (MEDEA 2002), at PACT 2002. Charlottesville, VA, USA, Sep. 22, 2002, pp. 16-25. Also appears in ACM SIGARCH Computer Architecture Newsletter, Mar. 2003, URL: http://www.ele.uri.edu/~uht/papers/EDEA2002final.pdf.

Morano et al., "Execution-Time Instruction Predication," Dept. of Electrical and Computer Engineering, University of Rhode Island, Kingston, RI 02881, Technical Report 0320020100, Mar. 2002, pp. 1-10, URL: http://www.ele.uri.edu/~uht/papers/Levo3TR032002-0100.pdf.

Nagarajan et al., "A Design Space Evaluation of Grid Processor Architectures," in Proceedings of the 30$^{th}$ Annual ACM/IEEE International Symposium on Microarchitecture, Austin, Texas, USA: ACM, Dec. 2001, pp. 40-51.

Pajuelo et al., "Speculative Dynamic Vectorization," in Proceedings of the 29$^{th}$ Annual International Symposium on Computer Architecture, Anchorage, Alaska, USA: ACM, May 25-29, 2002.

Papworth, "Tuning the Pentium Pro Microarchitecture," IEEE MICRO, vol. 16, No. 2, pp. 8-15, Apr. 1996.

Parcerisa et al., "Efficient Interconnects for Clustered Microarchitectures," in Proceedings of the Eleventh International Conference on Parallel Architectures and Compilation Techniques. Charlottesville, Virginia, USA: IEE, Sep. 22-25, 2002, 10 pages total.

Park et al., "Reducing Register Ports for Higher Speed and Lower Energy," in Proceedings of the 35$^{th}$ Annual International Symposium on Microarchitecture, Istanbul, Turkey: IEEE, ACM, Nov. 2002, 12 pages total.

Patt et al., "HPS, a New Microarchitecture: Rationale and Introduction," in Proceedings of the Eighteenth Annual Workshop on Microprogramming (MICRO-18): IEEE and ACM, Dec. 1985, pp. 103-108.

Popescu et al., "The.sub.—Metaflow Architecture," IEEE MICRO, vol. 11, No. 3, Jun. 1991, pp. 10-13 & 63-73.

Preston et al., "Design of an 8-wide Superscalar RISC Microprocessor with Simultaneous Multithreading," in Proceedings of the International Solid State Circuits Conference, Jan. 2002. Slides from talk at conference also referenced, 6 pages total.

Raasch et al., "A Scalable Instruction Queue Using Dependence Chains," in Proceedings of the 29th Annual International Symposium on Computer Architecture. Anchorage, Alaska, USA: ACM, May 25-29, 2002, 12 pages total.

Rau et al., "Instruction-level parallel processing: History, overview and perspective," International Journal of Supercomputing, vol. 7, pp. 9-50, Oct. 1996.

Rau et al., "The cydra 5 departmental supercomputer: Design and philosophies, decisions and tradeoffs," IEEE Computer Magazine, vol. 22, pp. 12-34, Jan. 1989.

Riseman et al., "The Inhibition of Potential Parallelism by Conditional Jumps," IEEE Transactions on Computers, vol. C-21, No. 12, pp. 1405-1411, Dec. 1972.

Rotenberg et al., "control independence in trace processors," in IEEE Symposium on Microarchitecture, pp. 4-15, Dec. 1999.

Rotenberg et al., "Trace processors," in IEEE Symposium on Microarchitecture, pp. 138-148, Dec. 1997.

Sankaralingam et al., "Exploring ILP, TLP, and DLP with the Polymorphous TRIPS Architecture," in Proceedings of the 30th Annual International Symposium on Computer Architecture. San Diego, California, USA: ACM and IEEE, Jun. 9-11, 2003, 12 pages total.

Sazeides et al., "The Performance Potential of Data Dependence Speculation & Collapsing," in Proceedings of the 29th International Symposium on Microarchitecture (MICRO-29): IEEE and ACM, Dec. 1996, pp. 238-247.

Sazeides et al., "The predictability of data values," in Proceedings of the 30th International Symposium on Microarchitecture, pp. 248-258, Dec. 1997, 11 pages total.

Seznec et al., "Register Write Specialization Register Read Specialization: A Path to Complexity-Effective Wide-Issue Superscalar Processors," in Proceedings of the 35th Annual International Symposium on Microarchitecture. Istanbul, Turkey: IEEE,ACM, Nov. 2002, 12 pages total.

Smith et al., "Boosting Beyond Static Scheduling in a Superscalar Processor," in Proceedings of the 17th Annual International Symposium on Computer Architecture, pp. 344-354, IEEE and ACM, May 1990.

Smith, "A Study of Branch Prediction Strategies," in Proceedings of the 8th Annual Symposium on Computer Architecture, pp. 135-148, IEEE, and ACM, 1981.

Smith, "Architecture and Applications of the HEP Multiprocessor Computer," Society of Photo-optical Instrumentation Engineers, No. 298, pp. 241-248, 1981.

Sohi et al., "Multiscalar processors," in Proceedings of the International Symposium on Computer Architecture, IEEE and ACM, pp. 414-425, Jun. 1995.

Su et al., "GURR—A Method for Global Software Pipelining," in Proceedings of the Twentieth Annual Workshop on Microprogramming (MICRO-20), Association of Computing Machinery,pp. 88-96, Dec. 1987.

Taylor et al., "The Raw Microprocessor: A Computational Fabric for Software Circuits and General-Purpose Programs," IEEE Micro, vol. 22, No. 2, pp. 25-35, Mar.-Apr. 2002.

Thornton, "Parallel operation in control data 6600," in Proceedings of the AFIPS Fall Joint Computer Conference, pp. 33-40, 1964.

Tjaden et al., "Representation of Concurrency with Ordering Matrices," IEEE Transactions on Computers, vol. C-22, No. 8, pp. 752-761, Aug. 1973.

Tjaden, "Representation and Detection of Concurrency Using Ordering Matrices," Ph. D. Thesis, The Johns Hopkins University, 199 pages total, 1972.

Tomasulo; "An Efficient Algorithm for Exploiting Multiple Arithmetic Units," IBM Journal of Research and Development, vol. 11, No. 1, pp. 25-33, Jan. 1967.

Tubella et al., "Control speculation in multithreaded processors through dynamic loop detection," in Proceedings of the 4th Symposium on High Performance Computer Architecture, pp. 1423, Jan. 1998.

Tullsen et al., "Simultaneous Multithreading: Maximizing On-Chip Parallelism," in Proceedings of the 22nd Annual International Symposium on Computer Architecture: ACM, Jun. 22-24, 1995, pp. 392-403.

Uht et al., "Branch Effect Reduction Techniques," IEEE COMPUTER, vol. 30, No. 5, pp. 71-81, May 1997.

Uht et al., "Disjoint Eager Execution: An Optimal Form of Speculative Execution," in Proceedings of the 28th International Symposium on Microarchitecture, MICRO-28, pp. 313-325, ACM-IEEE, Nov./Dec. 1995.

Uht et al., "Realizing High IPC Using TimeTagged Resource Flow Computing," in Proceedings of the Euro-Par 2002 Conference, Springer-Verlag Lecture Notes in Computer Science. Paderborn, Germany: ACM, IFIP, Aug. 28, 2002, pp. 490-499. URL: http://www.ele.uri.edu/.about.uht/papers/Euro-Par2002.ps.

Uht, "A Theory of Reduced and Minimal Procedural Dependencies," IEEE Transactions on Computers, vol. 40, No. 6, pp. 681-692, Jun. 1991. Also appears in the tutorial "Instruction-Level Parallel Processors", Torng, H.C., and Vassiliadis, S., Eds.,IEEE Computer Society Press, 1995, pp. 171-182.

Uht, "An Efficient Hardware Algorithm to Extract Concurrency From General Purpose Code," Proceedings of the Nineteenth Annual Hawaii International Conference on System Sciences, Jan. 1986, pp. 41-50.

Uht, "Concurrency Extraction via Hardware Methods Executing the Static INstruction Stream," IEEE Transactions on Computers, vol. 41, No. 7, pp. 826-841, Jul. 1992.

Uht, "Hardware Extraction of Low-Level Concurrency from Sequential Instruction Streams," PhD thesis, Electrical and Computer Engineering, Carnegie-Mellon University, Pittsburgh, Dec. 1985, 200 pages.

Uht, "High Performance Memory System for High ILP Microarchitectures," Technical Report 0797-0002, Department of Electrical and Computer Engineering, University of Rhode Island, Aug. 26, 1997. Available via http://ele.uri.edu/about.uht, 10 pages total.

Wallace et al., "Threaded Multiple Path Execution," in 25th Annual International Symposium on Computer Architecture: ACM, Jun. 1998, pp. 238-249.

Wenisch et al., HDLevo—VHDL Modeling of Levo Processor Components, Department of Electrical and Computer Engineering, University of Rhode Island, Kingston, RI, Technical Report 072001-100, Jul. 20, 2001, URL:http://www.sub.—.ele..sub.—uri.edu/.about.uht/papers/HDLevo..sub.—pdf, 36 pages total.

Wu et al., "Compiler Managed Micro-cache Bypassing for High Performance EPIC Processors," in Proceedings afthe 35th Annual International Symposium on Microarchitecture. Istanbul, Turkey: IEEE, ACM, Nov. 2002, 12 pages total.

Xilinx Staff, "Gate Count Capacity Metics for FPGAs," Xilinx Corp., San Jose, CA, Application Note XAPP 059 (Y. 1.1), Feb. 1, 1997, URL: http://www.xilinx.comlxapp/xapp059.pdf. accessed: Jun. 2001, 6 pages total.

Zahir et al., "Os and compiler considerations in the design of the ia-64 architecture," in Proceedings of the International Conference on Architectural Suport for Programming Languages and Operating Systems, pp. 212-221, Nov. 2000.

Krewell, "IntellQ01 Earnings Plummet." Cahners Microprocessor, vol. 15, No. 5, May 2001, 1 page total.

Martin et al., "Timestamp snooping: An approach for extending smps," in Proceedings of the International Conference on Architectural Support for Programming Languages and Operating Systems, pp. 25-36, Nov. 2000.

* cited by examiner

DISJOINT  NESTED  OVERLAPPED

Snapshot taken at t = 9+ of Example 5.
-new I matches target address in stack

Key:
v - valid entry
p - predicate address
TA - Target Address
$P_r$ - region predicate
$cp_T$ - Targeting cancelling-predicate

| load time | address | code | | predicate-assignment (at load time) stack | | | | | predicate-use (at code execution time) | | |
|---|---|---|---|---|---|---|---|---|---|---|---|
| | | | | B v $p_l$ P $_l$ TA | $p_{in}$=$p_r$ | $cp_{in}$ | $p_{out}$ | $cp_{out}$ | $p_l$ - condition for $I$ execution |
| 1 | 100 | $I_1$ | $z = x$ op $y$ | empty | 1 | 0 | $p_1$=1 | - | 1 |
| 2 | 200 | $B_2$ | if ($bc_2$) goto 400 | $B_2$ 1 $P_2$ 400 | 1 | 0 | $p_2$=$\overline{bc_2}$ | $bc_2$ | 1 |
| 3 | 300 | $I_3$ | | $B_2$ 1 $P_2$ 400 | $P_2$ | 0 | - | - | $\overline{bc_2}$ |
| 4 | 400 | $I_4$ | | empty | $P_2$ | $cp_2$ | $\overline{bc_2}$+$bc_2$ | - | $\overline{bc_2}$+$bc_2$=1 |
| 5 | 500 | $I_5$ | | empty | $P_4$ | 0 | - | - | $p_4$=1 |
| 6 | 600 | $B_6$ | if ($bc_6$) goto 800 | $B_6$ 1 $P_6$ 800 | $P_4$ | 0 | $\overline{bc_6} \cdot p_4$ | $bc_6 \cdot p_4$ | 1 |
| 7 | 700 | $I_7$ | | $B_6$ 1 $P_6$ 800 | $P_6$ | 0 | - | - | $\overline{bc_6}$ |
| 8 | 800 | $I_8$ | | empty | $P_6$ | $cp_6$ | $\overline{bc_6}$+$bc_6$ | - | $\overline{bc_6}$+$bc_6$=1 |
| 9 | 900 | $I_9$ | | empty | $P_8$ | 0 | - | - | $p_6$=1 |

Equations - for "I": $p_l = p_{out} = p_{in} + cp_{in}$; for "B": $p_{out} = \overline{bc} \cdot p_{in}$; $cp_{out} = bc \cdot p_{in}$

FIG. 3

| load time | address | code | | stack (predicate-assignment at load time) | | | $p_{in}=p_r$ | $cp_{in}$ | $p_{out}$ | $cp_{out}$ | $p_l$ - condition for l execution |
|---|---|---|---|---|---|---|---|---|---|---|---|
| | | | | B | v p_l | TA | | | | | |
| 1 | 100 | $I_1$ | z = x op y | empty | | | 1 | 0 | $p_1=1$ | - | 1 |
| 2 | 200 | $B_2$ | if ($bc_2$) goto 800 | $B_2$ | 1 $P_2$ | 800 | 1 | 0 | $p_2=\overline{bc_2}$ | $bc_2$ | 1 |
| 3 | 300 | $I_3$ | | $B_2$ | 1 $P_2$ | 800 | $P_2$ | 0 | - | - | $\overline{bc_2}$ |
| 4 | 400 | $B_4$ | if ($bc_4$) goto 600 | $B_4$ $B_2$ | 1 $P_4$ 1 $P_2$ | 600 800 | $P_2$ | 0 | $\overline{bc_4}+p_2$ | $bc_4 \cdot p_2$ | 1 |
| 5 | 500 | $I_5$ | | $B_4$ $B_2$ | 1 $P_4$ 1 $P_2$ | 600 800 | $P_4$ | 0 | - | - | $\overline{bc_2} \cdot \overline{bc_4}$ |
| 6 | 600 | $I_6$ | | $B_2$ | 1 $P_2$ | 800 | $P_4$ | $cp_4$ | $p_6 \cdot cp_4$ | - | $\overline{bc_4} \cdot \overline{bc_2}+bc_4 \cdot \overline{bc_2}=\overline{bc_2}$ |
| 7 | 700 | $I_7$ | | $B_2$ | 1 $P_2$ | 800 | $P_6$ | 0 | - | - | $\overline{bc_2}$ |
| 8 | 800 | $I_8$ | | empty | | | $P_6$ | $cp_2$ | $p_6+cp_2$ | - | $\overline{bc_2}+bc_2=1$ |
| 9 | 900 | $I_9$ | | empty | | | $P_8$ | 0 | - | - | 1 |

Equations - for "I": $p_l=p_{out}=p_{in}+cp_{in}$; for "B": $p_{out}=\overline{bc} \cdot p_{in}$; $cp_{out}=bc \cdot p_{in}$

| load time | address | code | | | | predicate-assignment (at load time) | | | | predicate-use (at code execution time) | | |
|---|---|---|---|---|---|---|---|---|---|---|---|---|
| | | | B | stack v_l p_l TA | | | $p_{in}=p_r$ | $cp_{in}$ | $p_{out}$ | $cp_{out}$ | $p_l$ – condition for $l$ execution | |
| 1 | 100 | $I_1$ | | empty | | | 1 | 0 | $p_1=1$ | – | 1 | |
| 2 | 200 | $B_2$ | $B_2$ | 1 $P_2$ | 600 | | 1 | 0 | $p_2=\overline{bc_2}$ | $bc_2$ | 1 | |
| 3 | 300 | $I_3$ | $B_2$ | 1 $P_2$ | 600 | | $P_2$ | 0 | – | – | $\overline{bc_2}$ | |
| 4 | 400 | $B_4$ | $B_4$ | 1 $P_4$ | 800 | | $P_2$ | 0 | $\overline{bc_4}+p_2$ | $bc_4 \cdot p_2$ | 1 | |
| | | | $B_2$ | 1 $P_2$ | 600 | | | | | | | |
| 5 | 500 | $I_5$ | $B_4$ | 1 $P_4$ | 800 | | $P_4$ | 0 | – | – | $(\overline{bc_4} \cdot \overline{bc_2}) + bc_2 = \overline{bc_4} + bc_2$ | |
| | | | $B_2$ | 1 $P_2$ | 600 | | | | | | | |
| 6 | 600 | $I_6$ | $B_4$ | 1 $P_4$ | 800 | | $P_4$ | $cp_2$ | $p_4 \cdot cp_2$ | – | $\overline{bc_4} + bc_2$ | |
| | | | $B_2$ | 1 $P_2$ | 600 | | | | | | | |
| 7 | 700 | $I_7$ | $B_4$ | 1 $P_4$ | 800 | | $P_6$ | 0 | – | – | $\overline{bc_4} + bc_2 + (\overline{bc_4} \cdot \overline{bc_2}) = 1$ | |
| | | | $B_2$ | 0 $P_2$ | 600 | | | | | | | |
| 8 | 800 | $I_8$ | $B_4$ | 1 $P_4$ | 800 | | $P_6$ | $cp_4$ | $p_6 + cp_4$ | – | – | |
| | | | $B_2$ | 0 $P_2$ | 600 | | | | | | | |
| 9 | 900 | $I_9$ | | empty | | | $P_8$ | 0 | – | – | 1 | |

Code:
- $I_1$: 
- $B_2$: if ($bc_2$) goto 600
- $I_3$: $z = x$ op $y$
- $B_4$: if ($bc_4$) goto 800
- $I_5$
- $I_6$
- $I_7$
- $I_8$
- $I_9$ Equations – for "I": $p_l = p_{out} = p_{in} + cp_{in}$; for "B": $p_{out} = \overline{bc} \cdot p_{in}$; $cp_{out} = bc \cdot p_{in}$

| | | | | predicate-assignment (at load time) | | | | predicate-use (at code execution time) | | |
|---|---|---|---|---|---|---|---|---|---|---|
| load time | address | code | | stack B v p TA | $p_{in}=p_i$ | $cp_{in}$ | $p_{out}$ | $cp_{out}$ | $p_i$ - condition for I execution |
| 1 | 100 | $I_1$ | z = x op y | empty | 1 | 0 | $p_1=1$ | - | 1 |
| 2 | 200 | $B_2$ | if ($bc_4$) goto 800 | $B_2$ 1 $P_2$ 1000 | 1 | 0 | $p_2=\overline{bc_2}$ | $bc_2$ | 1 |
| 3 | 300 | $I_3$ | | $B_2$ 1 $P_2$ 1000 | $P_2$ | 0 | - | - | $\overline{bc_2}$ |
| 4 | 400 | $B_4$ | if ($bc_4$) goto 800 | $B_4$ 1 $P_4$ 800<br>$B_2$ 1 $P_2$ 1000 | $P_2$ | 0 | $\overline{bc_4}+p_2$ | $bc_4 \cdot p_2$ | 1 |
| 5 | 500 | $I_5$ | | $B_4$ 1 $P_4$ 800<br>$B_2$ 1 $P_2$ 1000 | $P_4$ | 0 | - | - | $\overline{bc_4}\cdot\overline{bc_2}$ |
| 6 | 600 | $B_6$ | if ($bc_6$) goto 1200 | $B_6$ 1 $P_6$ 1200<br>$B_4$ 1 $P_4$ 800<br>$B_2$ 1 $P_2$ 1000 | $P_4$ | 0 | $\overline{bc_6}\cdot p_4$ | $bc_6 \cdot p_4$ | 1 |
| 7 | 700 | $I_7$ | | $B_6$ 1 $P_6$ 1200<br>$B_4$ 1 $P_4$ 800<br>$B_2$ 1 $P_2$ 1000 | $P_6$ | 0 | - | - | $\overline{bc_6}\cdot\overline{bc_4}\cdot\overline{bc_2}$ |
| 8 | 800 | $I_8$ | | $B_6$ 1 $P_6$ 1200<br>$B_4$ 0 $P_4$ 800<br>$B_2$ 1 $P_2$ 1000 | $P_6$ | $cp_4$ | $p_6+cp_4$ | - | $(\overline{bc_6}\cdot\overline{bc_4}\cdot\overline{bc_2})+(bc_4\cdot\overline{bc_2})$<br>$=(\overline{bc_6}+bc_4)\overline{bc_2}$ |
| 9 | 900 | $I_9$ | | $B_6$ 1 $P_6$ 1200<br>$B_4$ 0 $P_4$ 800<br>$B_2$ 1 $P_2$ 1000 | $P_8$ | 0 | - | - | $(\overline{bc_6}+bc_4)\overline{bc_2}$ |
| 10 | 1000 | $I_{10}$ | | $B_6$ 1 $P_6$ 1200 | $P_8$ | $cp_2$ | $p_8+cp_2$ | - | $((\overline{bc_6}+bc_4)\overline{bc_2})+bc_2$<br>$=\overline{bc_6}+bc_4+bc_2$ |
| 11 | 1100 | $I_{11}$ | | $B_6$ 1 $P_6$ 1200 | $P_{10}$ | 0 | - | - | $(\overline{bc_6}+bc_4)bc_2$ |
| 12 | 1200 | $I_{12}$ | | empty | $P_{10}$ | $cp_6$ | $p_{10}+cp_6$ | - | $bc_6+bc_4+bc_2+$<br>$(\overline{bc_6}\cdot\overline{bc_4}\cdot\overline{bc_2})=1$ |
| 13 | 1300 | $I_{13}$ | | empty | $P_{12}$ | 0 | - | - | 1 |

Equations - for "I": $p_i=p_{out}=p_{in}+cp_{in}$; for "B": $p_{out}=\overline{bc}\cdot p_{in}$; $cp_{out}=bc\cdot p_{in}$

FIG. 6

AUTOMATIC AND TRANSPARENT HARDWARE CONVERSION OF TRADITIONAL CONTROL FLOW TO PREDICATES

CROSS REFERENCE TO RELATED APPLICATIONS

This application is a continuation of U.S. patent application Ser. No. 09/838,678, filed Apr. 19, 2001 (now U.S. Pat. No. 7,210,025), which claims priority from the provisional application designated Ser. No. 60/198,300, filed Apr. 19, 2000 and entitled "Automatic and Transparent Hardware Conversion of Traditional Control Flow to Predicates". These applications are hereby incorporated by reference.

GOVERNMENT LICENSE

This invention was made with government support under Grant Nos. MIP-9708183, EIA-9729839, and DUE-9751215, awarded by the National Science Foundation. The government has certain rights in this invention.

TECHNICAL FIELD

The invention relates to the field of computing devices, and in particular to a computing device that includes automatic and transparent hardware conversion of traditional control flow predicates.

BACKGROUND OF THE INVENTION

Computer programs typically use traditional control flow constructs to determine when and if instructions in the program are executed. Such constructs include "if-then-else" statements and various looping statements such as: "while (condition is true){ . . . }", "for (i initialized to 1; while i<10; increment i every loop iteration) { . . . }" and "do i=1 to 10 . . . enddo". The majority of such control statements are realized with machine-level instructions called branches, and most of these are conditional branches.

Branches are used as follows. Most computers employ a model of computation using a pointer to the code of the program it is executing. The pointer is provided by a program counter (PC) that contains the address of the machine instruction the computer is currently executing. Every time an instruction is executed, the default action is to increment the program counter to point to the next instruction to be executed. Most useful programs employ branches to conditionally modify the contents of the program counter to point to other places in a program, not just the next instruction. Therefore, a conditional branch has the semantics: if (condition is true) then load the program counter with a (specified) value.

A well-known alternative to conditional branches is the use of predicates. A predicate is typically a one-bit variable having the values true or false; it is usually set by a comparison instruction. In this model every instruction has a predicate as an additional input. The semantics is that the instruction is only effectively executed (i.e., its output state changed) if the predicate is true. An example of equivalent classic control flow and modern predication is as follows.

| Classic code: | Predicated code: |
|---|---|
| 1. if (a = = b) { | 1. Prod = (a = = b); //Prod set to true if a equals b. |
| 2. z = x + y; | 2. IF (Pred) THEN z = x + y; //Operations performed only |
| 3. w = a + b; } | 3. IF (Pred) THEN w = a + b; // if Pred true. |
| 4. // later instructions: // all dependent on 1. | 4. // later instructions: NOT dependent on 1. |

In traditional computers, all instructions following a branch are dependent on the branch and must wait for the branch to execute before executing themselves. This has been demonstrated to be a significant barrier in realizing much parallelism within a program, thus keeping performance gains low.

However, with predication, only the instructions having the equivalent predicate as an input are dependent on the branch-remnant (the comparison operation). In the example and, in general, this means the instructions after the predicated instructions are now independent of the branch-remnant and may be executed in parallel with instructions before the branch-remnant, improving performance.

Current approaches to using predication use visible and explicit predicates. The predicates are controlled by the computer user and they use storage explicitly present in the computer's instruction set architecture (similar to regular data registers or main memory). They are explicit since there is at least a single 1-bit predicate hardware register associated with each instruction. The most extreme example of this is the IA-64 (Intel Architecture-64 bits) architecture. The first realization of this architecture is the Itanium (formerly Merced) processor, due to be on the market in the year 2000. Itanium has 64 visible-explicit predicate registers. See for example the document by the Intel Corporation, entitled IA-64 Application Developer's Architecture Guide". Santa Clara, Calif.: Intel Corporation, May 1999. Order Number: 24188-001, via www.intel.com. The predicates cannot be effectively used when the processor executes traditional IA-32 (x86) machine code. Therefore, billions of dollars of existing software cannot take advantage of Itanium without modification. Other types of microprocessors have similar constraints to x86 processors. That is, predicates are not currently in their instruction set, so they cannot take advantage of predication techniques.

It is possible to predicate just a subset of the instructions of a processor, but then the benefits of predication are much less. Full predication is preferred.

In prior work we devised a method for realizing an equivalent to full predication called minimal control dependencies (MCD). See for example, the papers by: (i) A. K. Uht, "Hardware Extraction of Low-Level Concurrency from Sequential Instruction Streams", PhD thesis, Carnegie-Mellon University, December 1985, available from University Microfilms International, Ann Arbor, Mich., U.S.A; (ii) A. K. Uht, "An Efficient Hardware Algorithm to Extract Concurrency From General-Purpose Code," in *Proceedings of the Nineteenth Annual Hawaii International Conference on System Sciences*, University of Hawaii, in cooperation with the ACM and the IEEE Computer Society, January 1986; and (iii) A. K. Uht, "A Theory of Reduced and Minimal Procedural Dependencies," *IEEE Transactions on Computers*, vol. 40, pp. 681-692, June 1991. Each of these papers is incorporated herein by reference. MCD produced substantial performance gains, especially when coupled with another performance-enhancing technique of ours called disjoint eager execution, disclosed in the paper by A. K. Uht and V. Sindagi, entitled "Disjoint Eager Execution: An Optimal Form of Speculative Execution," in *Proceedings of the 28th International Symposium on Microarchitecture (MICRO-28)*, pp. 313-325, IEEE and ACM, November/December 1995. This paper is also incorporated herein by reference. MCD can be considered to have hidden and implicit predicates, in that the predicates are not visible to the user, nor are they explicitly present in the processor. However, MCD has disadvantages when compared to predication such as a high hardware cost (e.g., more logic gates and storage) with relatively complex hardware. In particular, j-by-j diagonal bit matrices are required, where j is the number of instructions in the instruction window (those instructions currently under consideration for execution by the processor). In a high-ILP machine, j might be 256 or more, leading to a cumbersome 32,000 or more bit diagonal matrix. Further, all of the bits need to be accessed and operated on at the same time, leading to a very complex and potentially slow hardware layout. Lastly, setting the contents of the matrix when instructions are loaded into the processor is also costly and potentially slow.

Therefore, there is a need for an automatic and transparent hardware conversion of traditional control flow predicates.

SUMMARY OF THE INVENTION

Briefly, according to an aspect of the present invention, a computing device that provides hardware conversion of flow control predicates associated with program instructions executable within said computing device, detects the beginning and the end of a branch domain of said program instructions, and realizes the beginning and the end of said branch domain at execution time, for selectively enabling and disabling instructions within said branch domain.

These and other objects, features and advantages of the present invention will become apparent in light of the following detailed description of preferred embodiments thereof, as illustrated in the accompanying drawings.

BRIEF DESCRIPTION OF THE DRAWINGS

FIG. 3 illustrates a hidden-explicit predication example for disjoint branches;

FIG. 4 illustrates a hidden-explicit predication example for nested branches;

FIG. 5 illustrates a hidden-explicit predication example for overlapped branches; and FIG. 6 illustrates a hidden-explicit predication example for mixed branches.

DETAILED DESCRIPTION OF THE INVENTION

Hidden-explicit predicates are realized by the invention; the predicates are not visible to the user and thus may be implemented in any processor architecture, and the predicates occupy explicit hardware register bits in the processor, reducing cost and complexity. There are two parts to the invention: the predicate-assignment part, taking place when instructions are loaded into the processor, and the predicate-use part, taking place at instruction execution time.

Nomenclature: A branch's domain includes the instructions occurring between the branch and the branch's target. Thus, the branch controls the execution of the instructions within its domain. If the branch's condition evaluates true the branch is taken, and the instructions in its domain are not executed. If the branch's condition evaluates false, the branch is not taken and the instructions in the branch's domain are allowed to execute.

Figure 1:
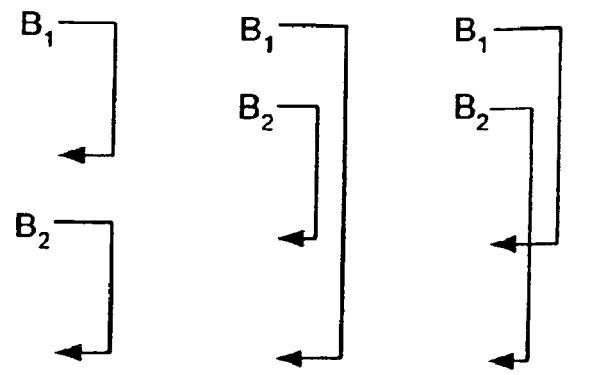
FIG. 1 is a pictorial illustration of various branch arrangements.

Multiple branch domains can be arranged in a number of different ways, each of which are combinations of the three basic arrangements: disjoint, nested and overlapped, as shown in FIG. 1. For full predication all possible combinations of these arrangements must be handled correctly. The invention does this.

Key Ideas The predicate-assignment hardware detects the beginnings and ends of branch domains. The predicate-use hardware employs this information to realize the beginnings and ends of domains at execution time, performing the appropriate enabling and disabling of instructions in domains.

In general, as each new domain is encountered during code execution, a new condition is placed on the execution of the code within the new domain. If the branch condition of the domain's branch is $bc_i$, and the predicate of the code before the branch is $p_r$, then the effective predicate $p_e$ of the new code in the new branch's domain is computed as:

$$p_e = \overline{bc_i} \cdot p_r$$

When a domain is exited (upon reaching the corresponding branch's target instruction) the effect of the corresponding branch must be nullified, in other words $bc_i$ should have no effect on the execution of the following code. This is achieved by effectively OR-ing the opposite value of the branch condition with the current predicate; in other words, the following is effectively computed for the code after the branch domain:

$$P_{e2} = p_e + (bc_i \cdot p_r) = (\overline{bc_i} \cdot p_r) + (bc_i \cdot p_r) = p_r$$

This logic is realized by the combined operation of the predicate-assignment and predicate-use hardware.

Predicate-Assignment Hardware and Operation

Figure 2:
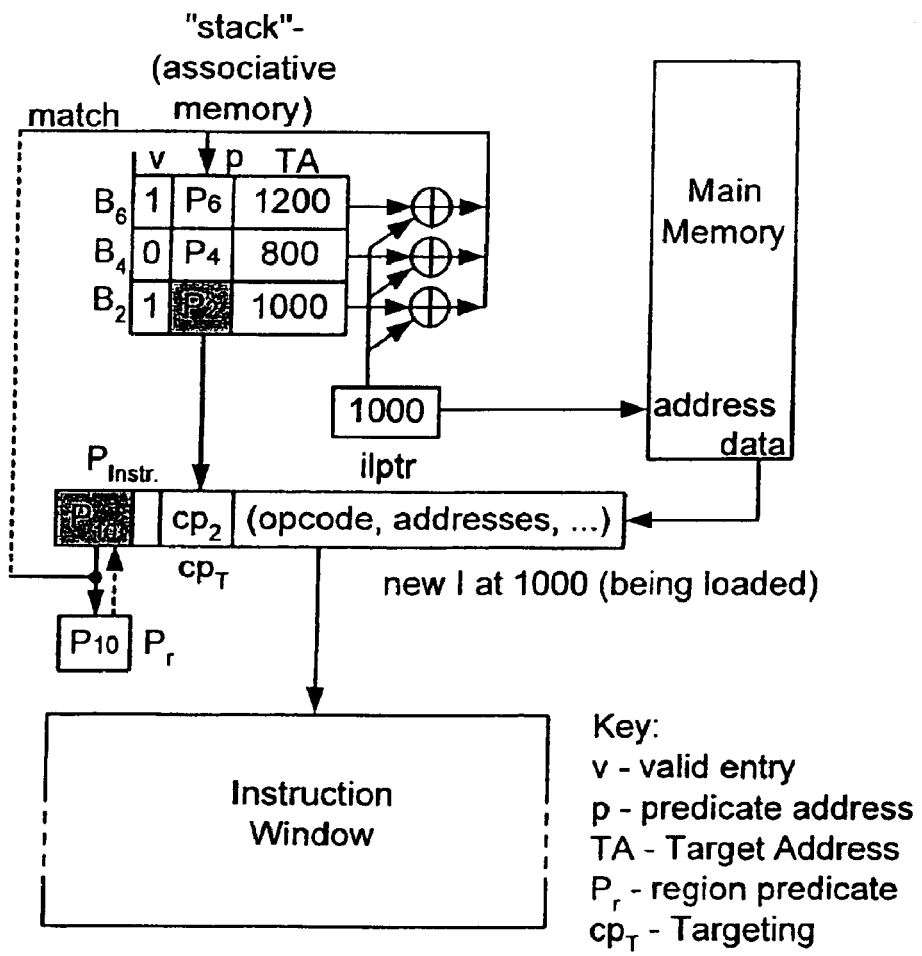
FIG. 2 is a block diagram illustration of predicate-assignment hardware.

The predicate-assignment hardware assigns predicate and canceling predicate addresses to instructions as they are loaded into the processor's load buffer and before the buffer contents are sent to the instruction window for execution. The assignment is performed by detecting domain entries (branches) and exits (targets). The basic hardware structure is a branch tracking stack or buffer as shown in FIG. 2. FIG. 2 is a block diagram illustration of predicate-assignment hardware, that includes a stack that is associatively addressed by the current value of the ilptr (instruction lead pointer). The predicate address of the branch corresponding to a target address match with the ilptr is output from the hardware and used to augment the state of the instruction being loaded. The Pr register holds the address of the current region's predicate. Pr may point to the predicate from either a branch or a branch target.

In the context of the present invention, the term "stack" is used in its generic sense; it is contemplated that any kind of temporary storage may be used.

Each entry (row) in the stack corresponds to one branch. Typically, but not necessarily, a branch is on the stack only while the instruction load pointer ilptr value is within the branch's domain. The following fields compose each entry:

1. address of predicate corresponding to the branch $p_b$;
2. address of canceling predicate corresponding to the branch $cp_b$; in practice this may be derived from the branch's predicate address, so no explicit entry would be needed for canceling predicate addresses;
3. target address of the branch $ta_b$; and
4. valid bit flag $v_b$; true while the target of the corresponding branch has not yet been reached; the stack entry may be reclaimed and reused when the valid bit is false.

A branch is placed on the stack when it is encountered by the ilptr and is removed when its target is reached. In the case of overlapped branches, the target for a branch may be reached before a prior branch's target has been reached. In this case the overlapped branch has its valid bit flag v bit cleared, and is removed from the stack when convenient.

The comparators look for a match between the instruction load pointer ilptr and the target addresses. If there is a match, it indicates that the instruction just loaded is the target of the matching branch (multiple matches will be considered later). The current canceling predicate address $cp_r$ is set equal to the canceling predicate address of the matching branch. The current canceling predicate address $cp_r$ is entered into the canceling predicate address field of the instruction being loaded.

Out-of-Bounds Branches: Branches with targets inside the window have been considered. It is also possible that a branch in the window may jump to a point not yet encountered by the predicate-assignment hardware. Therefore, the hardware illustrated in FIG. 2 is augmented with additional circuitry to handle these out-of-bounds branches. The new circuitry includes primarily another set of comparators for performing associative lookups on field "p".

The technique is as follows. A candidate branch for execution supplies its predicate address to the tracking buffer circuitry. The address is used as a key to perform a lookup on the "p" field. If a branch's domain is wholly contained in the window, then the branch will not have a valid entry in the buffer. Therefore, if the candidate branch does obtain a valid match, it is an out-of-bounds branch. The branch's target address is then read from the corresponding TA tracking buffer entry. The latter reduces storage costs, as target addresses need not be stored in the window, and also simplifies operation because target addresses do not need to be read from the window.

Predicate-Use Hardware and Operation

The Predicate-Use (PredU) hardware augments the state and operations of instructions held in the processor's instruction window. None of the Predicate-Use hardware is visible to the user (i.e., it does not appear in the processor's instruction set architecture) and thus may be applied to any type of processor.

The overall effect of the Predicate Use hardware is to chain predicate sources and sinks so as to both enforce the functionality of the system and to keep the hardware cost low. The alternative to chaining the predicates is to have many predicate inputs for each instruction, which would be costly in terms of additional instruction state and therefore also more complex in operation.

The Predicate Use hardware and operations differ depending on whether the instruction is a branch or an assignment statement. Both cases are now considered.

Branch PredU Hardware and Operations: The output predicates are evaluated or re-evaluated whenever the input predicate or branch condition becomes available or changes value, resp.

Input: $p_r$—predicate of region, same as input predicate $p_{in}$.

Outputs:
  branch predicate:

$p_{out} = \overline{bc} \cdot p_r$ branch canceling predicate:

$cp_{out} = bc \cdot p_r$ bc is the Branch Condition of this branch, and has the values true (1) and false (0). It is set as the result of some comparison test operation such as: A<B. The comparison may be performed either as part of the branch's execution or as part of a prior instruction, depending on the processor architecture.

Execution Enabling Predicate: The branch executes whenever its inputs are available or change value. Therefore, all branches in the instruction window may execute in parallel and out-of-order.

Assignment Statement PredU Hardware and Operation: Assignment statements also have predicate inputs and outputs. These are used both for predicate-chaining and predicate-canceling. Recall that predicate-canceling occurs when a branch domain is exited.

Inputs:
  $p_r$—predicate of region; same as input predicate $p_{in}$; and
  $cp_r$—canceling predicate of targeting branch, if any; same as $cp_{in}$.

Output:

$p_{out} = p_r + cp_r = p_{in} + cp_{in}$ $p_{out}$ is computed independently of the rest of the assignment statement's execution and computations.

Execution or Assignment Enabling Predicate: $p_I$—same as output:

$p_I = p_{in} + cp_{in}$

The assignment instruction may modify its traditional sinks when $p_I$ is true. Such sinks are the results of the regular operations of the assignment statement, e.g., if the instruction is: A=B+C then A is a traditional sink and is written if the instruction's predicate evaluates true.

Case: Multiply-Targeted Instructions

There is a not-so-special case that can often arise in code and that we have not yet addressed. This is the case when an instruction is the target of more than one branch. In this scenario the hardware as described so far will not work, as it is only suitable for an instruction being the target of no more than one branch.

There are two solutions that can be employed to handle the multiple-target case. The first is to provide multiple canceling predicate fields for each instruction. This will cost more, but may be suitable for a small number of canceling predicates. However, we must handle the case when an instruction is the target of many branches (this is possible in many machines, although perhaps not likely).

A second solution is to insert a dummy No-Op instruction into the window after the current instruction if the instruction runs out of canceling predicate fields. The No-Op's canceling predicates can then be used in addition to the original instruction's. Since any number of No-Ops can be inserted, any number of branches targeting the same instruction can be handled. Of course, a price is paid for a "wasted" slot in the instruction window for each No-Op instruction added.

A suitable number of canceling predicate fields for one instruction may be empirically determined. It is likely that both solutions will be used in a typical processor.

Case: Branch is a Target of Another Branch

It is also possible, if not likely, that code will contain a branch that is the target of another branch. This scenario is readily handled by employing all of the predicate and canceling predicate logic in the branch, such that it appears as BOTH a branch and an assignment statement. The canceling predicate output of such an instruction is the same as that of an un-targeted version of the branch. The predicate output combines the functions of the branch predicate and the assignment statement predicate, with the branch portion using the assignment portion as its region predicate input:

$$p_{out} = \overline{bc} \cdot (p_r + cp_r) = \overline{bc}(p_{in} + cp_{in})$$

This works because the assignment portion effectively (logically) takes place before the branch.

EXAMPLES

We now present four examples to illustrate the operation of the hidden-explicit predicate system. The examples cover the following cases:
1. two disjoint branches, FIG. 3 (also covers the cases of straight-line code and a single branch);
2. two nested branches, FIG. 4.
3. two overlapped branches, FIG. 5.
4. three branches with a combination of nesting and overlapping, FIG. 6.

All of the examples have the same format. In the code column: "I" instructions are assignment statements, and "B" instructions are branches. The branch domains are shown with arrowed lines. Each example can be followed by first going down the predicate-assignment table entries, in order, as the instructions would be loaded. Using the tracking stack, this results in the predicate addresses shown in the $p_{in}$ and $cp_{in}$ columns being generated and entered into the corresponding instruction's fields in the instruction window.

Next, the predicate-use table entries may be examined to see how the predicates are evaluated at run-time, how their values are chained and how branch domains are effectively exited. For an example of the latter, refer to FIG. 3 and look at the $p_I$ entry for the assignment instruction at address 400. Although it has predicate inputs, their values cancel each other out, $p_I$ is effectively "1" and thus the instruction is always enabled for execution, as far as branches are concerned. This is correct, since it is outside the domains of all of the branches in the code example.

Although the present invention has been shown and described with respect to several preferred embodiments thereof, various changes, omissions and additions to the form and detail thereof, may be made therein, without departing from the spirit and scope of the invention.

What is claimed is:

1. A computing device to provide hardware conversion of control flow in machine code that is executable by said computing device, comprising:
predicate assignment means configured to detect the beginning and the end of a branch domain of original machine code based solely on said original machine code, said original machine code being executable by said computing device and by a target computing device different from said computing device; and
predicate use means configured to realize the beginning and the end of said branch domain at execution time, and to selectively enable and disable machine code within said branch domain during program execution.

2. The computing device according to claim 1 wherein said predicate assignment means includes a tracking buffer comprising storage to store branch information in order to make said predicate assignments.

3. The computing device according to claim 1, wherein said predicate assignment means is configured to assign a canceling predicate to said branch domain in order to delineate said branch domain.

4. The computing device according to claim 3, wherein said predicate use means further includes one or more registers for said original machine code to effect arbitrary control flow, said branch domain including at least a disjoint branch domain, a nested branch domain, overlapped branch domains, or a combination of said branch domains.

5. A method for providing hardware conversion of control flow to predicates comprising:
detecting the beginning and the end of a branch domain of original machine code based solely on said original machine code, said original machine code being executable within a target computing device different from said computing device;
generating from each said branch domain a predicate;
associating said predicate with at least one machine code; and
thereafter realizing the beginning and the end of said branch domain at execution time and selectively enabling and disabling execution of machine code within said branch domain.

6. The method according to claim 5 wherein said detecting step includes storing branch information to make said predicate assignments.

7. The method according to claim 5 wherein said predicate generating step assigns a canceling predicate to said branch domain in order to delineate said branch domain.

8. The method according to claim 7, wherein said predicate generating further includes using one or more registers for said original machine code to effect arbitrary control flow, said branch domain including at least a disjoint branch domain, a nested branch domain, overlapped branched domains, or a combination of said branch domains.

* * * * *

UNITED STATES PATENT AND TRADEMARK OFFICE
CERTIFICATE OF CORRECTION

PATENT NO. : 7,380,108 B1
APPLICATION NO. : 11/515220
DATED : May 27, 2008
INVENTOR(S) : Augustus K. Uht et al.

It is certified that error appears in the above-identified patent and that said Letters Patent is hereby corrected as shown below:

Claim 5 should read as follows:

5. A method for providing hardware conversion of control flow to predicates in a computing device comprising:

detecting the beginning and the end of a branch domain of original machine code based solely on said original machine code, said original machine code being executable within a target computing device different from said computing device;

generating from each said branch domain a predicate;

associating said predicate with at least one machine code; and thereafter realizing the beginning and the end of said branch domain at execution time and selectively enabling and disabling execution of machine code within said branch domain.

Signed and Sealed this

Fourteenth Day of April, 2009

JOHN DOLL
*Acting Director of the United States Patent and Trademark Office*

UNITED STATES PATENT AND TRADEMARK OFFICE
CERTIFICATE OF CORRECTION

PATENT NO.        : 7,380,108 B1
APPLICATION NO.   : 11/515220
DATED             : May 27, 2008
INVENTOR(S)       : Augustus K. Uht et al.

Page 1 of 1

It is certified that error appears in the above-identified patent and that said Letters Patent is hereby corrected as shown below:

Column 8, lines 31 - 44,

Claim 5 should read as follows:

5. A method for providing hardware conversion of control flow to predicates in a computing device comprising:

detecting the beginning and the end of a branch domain of original machine code based solely on said original machine code, said original machine code being executable within a target computing device different from said computing device;

generating from each said branch domain a predicate;

associating said predicate with at least one machine code; and thereafter realizing the beginning and the end of said branch domain at execution time and selectively enabling and disabling execution of machine code within said branch domain.

This certificate supersedes the Certificate of Correction issued April 14, 2009.

Signed and Sealed this

Fifth Day of May, 2009

JOHN DOLL
*Acting Director of the United States Patent and Trademark Office*